No. 786,448. PATENTED APR. 4, 1905.
G. W. KING, H. J. BARNHART & C. B. KING.
STEAM SHOVEL.
APPLICATION FILED JUNE 13, 1904.

Witnesses
E. Howard Walmsley.
Irvine Miller.

Inventors
George W. King,
Harry J. Barnhart,
Charles B. King,
by H. A. Toulmin
Attorney No. 786,448. PATENTED APR. 4, 1905.
G. W. KING, H. J. BARNHART & C. B. KING.
STEAM SHOVEL.
APPLICATION FILED JUNE 13, 1904.

No. 786,448. PATENTED APR. 4, 1905.
G. W. KING, H. J. BARNHART & C. B. KING.
STEAM SHOVEL.
APPLICATION FILED JUNE 13, 1904.

No. 786,448. Patented April 4, 1905.

UNITED STATES PATENT OFFICE.

GEORGE W. KING, HARRY J. BARNHART, AND CHARLES B. KING, OF MARION, OHIO, ASSIGNORS TO THE MARION STEAM SHOVEL COMPANY, OF MARION, OHIO, A CORPORATION OF OHIO.

STEAM-SHOVEL.

SPECIFICATION forming part of Letters Patent No. 786,448, dated April 4, 1905.

Application filed June 13, 1904. Serial No. 212,314.

*To all whom it may concern:*

Be it known that we, GEORGE W. KING, HARRY J. BARNHART, and CHARLES B. KING, citizens of the United States, residing at Marion, in the county of Marion and State of Ohio, have invented certain new and useful Improvements in Steam-Shovels, of which the following is a specification, reference being had therein to the accompanying drawings.

This invention relates to steam-shovels, and has for its object to increase the efficiency, durability, and ease of handling of machines of this character.

More specifically, our present invention relates, first, to an improved arrangement of the mounting of the swinging-drum and its gearing and engines relatively to the body and to the hoisting drum and engines; second, to certain novel features of construction whereby the A-frame and its guy or back leg may be readily lowered to adapt the shovel for transportation and permit it to pass through tunnels and bridges; third, to certain improvements in the draw-bar socket-casting at the rear end of the car-body; fourth, to certain improvements in the mode of connecting the forward ends of the swinging-cables; fifth, to certain improvements in the guiding devices for the hoisting-chain adjacent to the swinging-circle trunnion, and, sixth, to certain improvements in the construction and mode of uniting and intersupporting the structural elements constituting the front portion of the body of the shovel.

Our present invention consists in certain novel features relating to the several matters hereinbefore specified, which features we will now proceed to describe and will then particularly point out in the claims.

In the accompanying drawings, Fig. 8 is a vertical central sectional view through the front portion of the apparatus.

Figure 1:
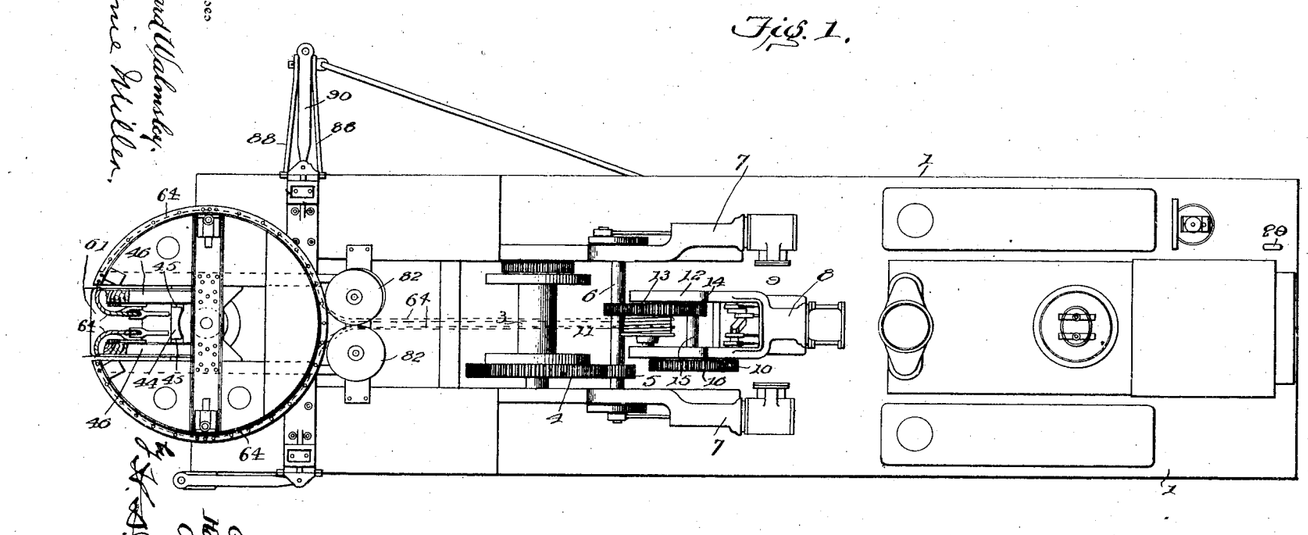
Figure 1 is a partial plan view of a steam-shovel embodying our invention.
Figure 3:
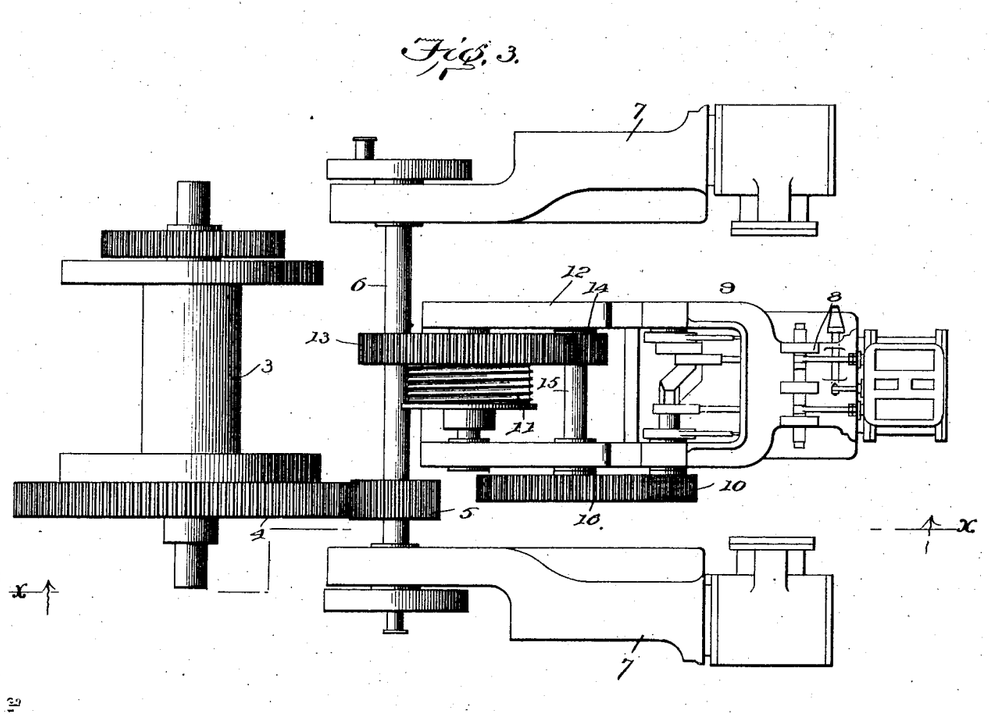
Fig. 3 is a plan view illustrating the relative arrangement of the hoisting and swinging drum, gearing, and engines.
Figure 4:
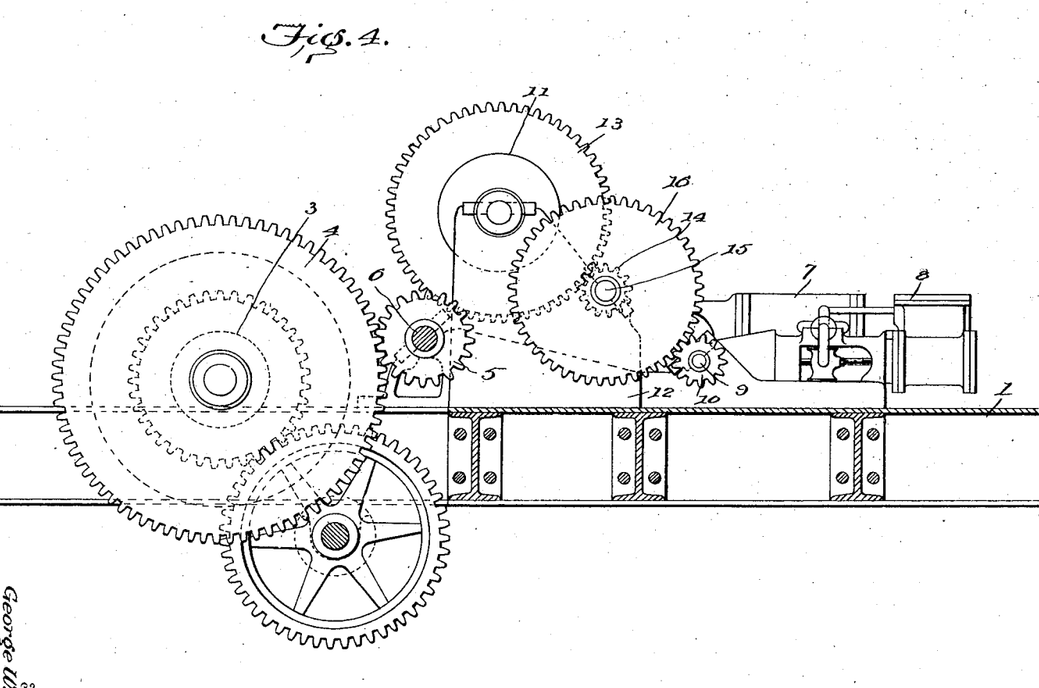
Fig. 4 is a vertical section taken on the line $x\ x$ of Fig. 3 and looking in the direction of the arrows.

Referring first to that feature of our invention which relates to the relative location and arrangement of the hoisting and swinging drums, gearing, and engines, which features are shown more particularly in Figs. 1, 3, and 4, 1 indicates the body or support of the steam-shovel, which is, as usual, in the general form of a car-body of the type known as a "flat-car," mounted upon wheels 2. On the deck of this car is mounted the hoisting-drum 3, provided with a gear 4, which meshes with a pinion 5 on a shaft 6, which is the crank-shaft of the hoisting-engines 7. These latter are arranged a sufficient distance apart to receive between them the swinging-engines 8, of which the crank-shaft (indicated at 9) carries a pinion 10. The swinging-drum 11 is mounted in a frame 12, which is located between hoisting-engines, but supported on the body 1 independently of said hoisting-engines and their frames. The swinging-drum 11 is provided with a gear 13, which meshes with a pinion 14 on a counter-shaft 15, also mounted in the frame 12, and this counter-shaft carries a gear 16, which meshes with the pinion 10 on the swinging-engine shaft. By reason of this construction the hoisting and swinging engines and their drums and gearing are compactly arranged, so as to occupy a minimum of space, while all of the parts are rendered readily accessible. In Letters Patent No. 760,456, granted to The Marion Steam Shovel Company, May 24, 1904, upon an application filed by us, we have described and claimed a somewhat similar arrangement of these parts, in which, however, the supporting-frame for the swinging-drum and its gearing is mounted upon the frames of the hoisting-engines. Our present arrangement of this frame between and independent of the hoisting-engine frames is more compact than the arrangement disclosed in said prior Letters Patent and at the same time not only renders the parts more accessible, but permits the removal of the hoisting-engines without affecting the swinging-drum or its gearing and supporting-frame.

Figure 5:
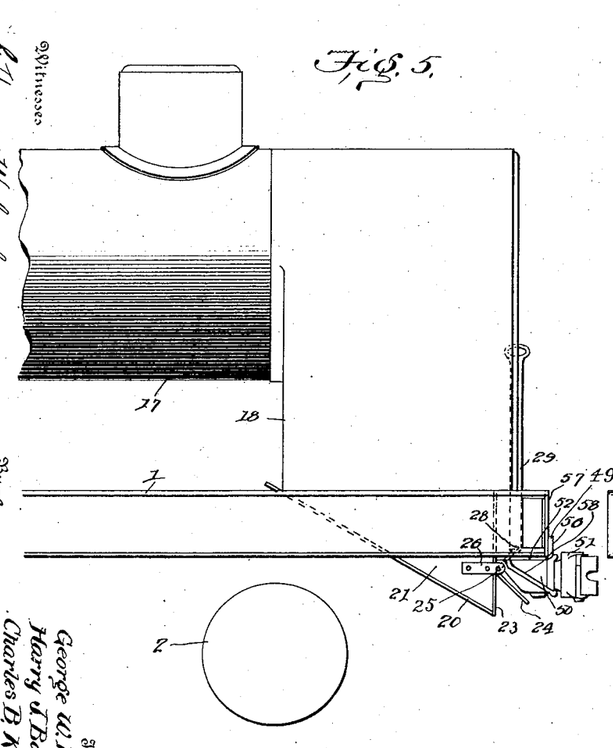
Fig. 5 is a side elevation, partly broken away, of the rear of the apparatus.
Figure 6:
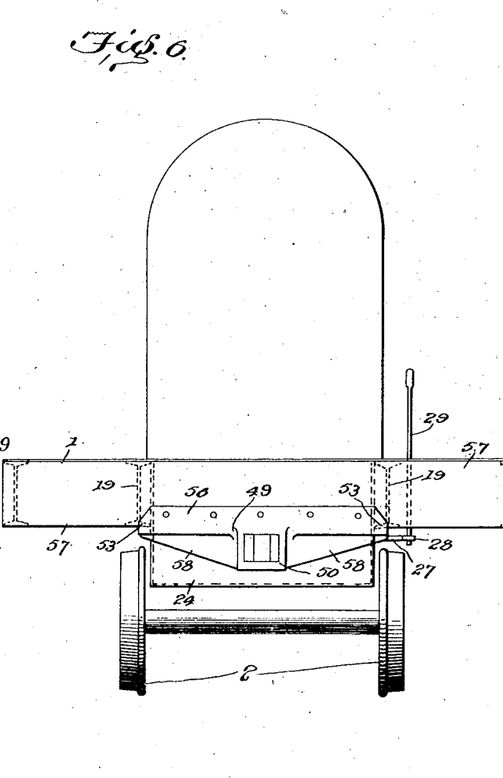
Fig. 6 is a detail rear elevation of what is shown in Fig. 5.
Figures 6, 7:
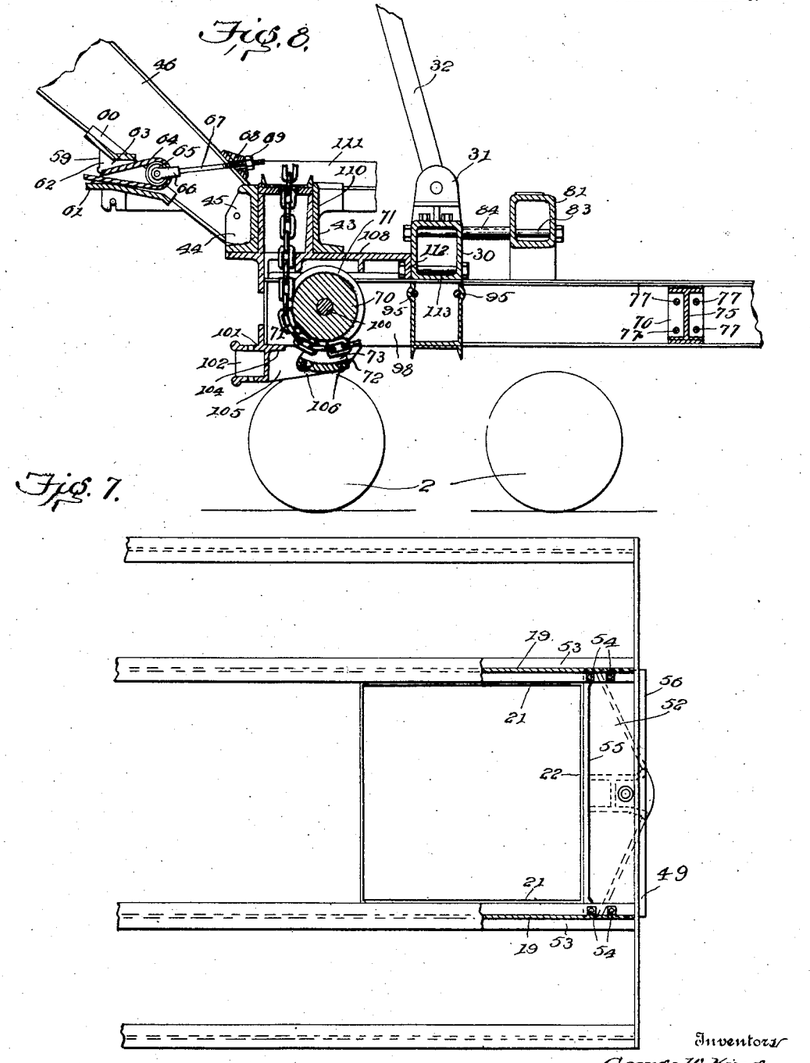
Fig. 7 is a detail plan view, partly in horizontal section, of the body-frame and rear draw-head socket-casting.

In Figs. 5, 6, and 7 we have shown a construction relating to the boiler, fire-box, and ash-pan, in which 17 indicates the boiler, and 18 the fire-box, which latter is located above the space between the two inner longitudinal sills 19 of the body. Between these sills is located the ash-pan, which comprises a downwardly and rearwardly inclined bottom 20, vertical sides 21, and a vertical rear wall 22, having an opening 23 at its lower portion controlled by the ash-door 24. This latter is mounted upon a shaft or pivotal axis 25, supported upon brackets 26, and said pivotal axis is extended at one side, as indicated at 27, and provided with a projecting arm 28, to which is pivoted the lower end of an actuating-rod 29, which extends up through the deck or floor of the body 1 and is provided with any suitable means for locking it in any position to which it may be adjusted. It will be noted that the inclined bottom of the ash-pan extends from the plane of the front of the fire-box continuously below said box, so that the ashes which fall upon said inclined bottom may slide down the same by gravity and pass out of the ash-box as fast as they are formed, thus avoiding the necessity of cleaning out the ash-pan and also preventing the burning out of the grates in the fire-box by reason of an excessive accumulation of ashes under said grates. The ash-door not only controls the discharge of ashes from the pan, but also serves as a damper or draft-regulator by means of which the supply of air to the fire-box through the grate thereof may be readily regulated. This draft-door is shown open in Fig. 5 and closed in Fig. 6 of the drawings.

We make no claim, however, in the present application to the ash-pan and ash-door construction just described, as the same forms the subject-matter of a divisional application filed by us October 3, 1904, Serial No. 227,081.

Figure 2:
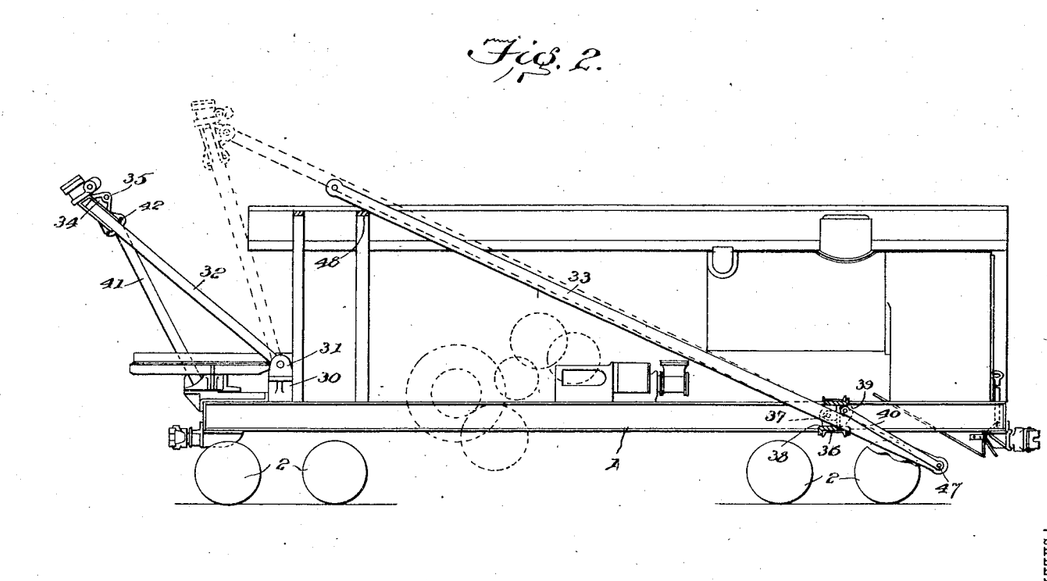
Fig. 2 is a similar side elevation.

Referring to the second feature of our invention, which relates to the lowering of the A-frame, which feature is illustrated more particularly in Fig. 2 of the drawings, it will be understood that the shovel must at times be transported along railway-lines upon which tunnels and bridges impose a limitation as to the height of the rolling-stock or its load capable of passing through or under the same. This and other considerations necessitate the removal of the boom and frequently require the removal or lowering of the A-frame.

Referring particularly to Fig. 2, 30 indicates a transverse sill, preferably in the form of a casting, to be hereinafter more particularly described, provided with lugs or brackets 31, to which the lower extremities of the A-frame 32 are pivoted. The A-frame is held in its operative or raised position, as shown in dotted lines in Fig. 2, by means of a guy or back leg 33, connected to the head 34 of the A-frame at 35 by means of a bolt or pin. The other end of the back leg 33 is in its normal position bolted to an anchor-casting 36, carried by the body 1, the point of connection being shown in dotted lines and indicated by the reference-numeral 37. Said anchor-casting is provided with an opening 38, formed through it, and with a lug or projection 39 at the rear thereof, to which two parallel links or tie-rods 40 may be connected. When it is desired to lower the A-frame, the bolt or pin which connects said A-frame and the back leg 33 is removed and the A-frame is lowered in a forward direction, as shown in Fig. 2, until it reaches the position shown in full lines in said figure, in which position it is supported by a brace 41, the upper end of which bears in a recess 42, formed in the lower end of the head 34 of the A-frame and indicated in dotted lines in Fig. 2. The lower end of the brace 41 bears upon the turn-table casting 43 in a recess 44 in the front of the same, formed between the vertical flanges 45, to which the lower ends of the boom members 46 are pivoted. It will be understood that this brace 41 is a separate and removable element, which is only in use when the A-frame is thus lowered, and is held in position when in use by the weight of the A-frame, which it supports. While the A-frame is thus lowered and supported the back leg is also lowered by moving it downward and rearward through the opening 38 in the anchor-casting 36 until it assumes the position shown in full lines in Fig. 2. It is supported and held in this lowered position by means of the links or tie-rods 40, which are connected to its lowered end by a removable bolt or pin 47. The upper end of the back leg is supported by one of the arches 48 of the roof of the machine. By reason of this construction both the A-frame and its back leg may be readily lowered to permit the shovel to be transported from place to place without involving the necessity of removing these parts from the shovel, and they may therefore be more readily replaced in working position when it is desired to use the shovel again at its destination.

Referring next to the third feature of our invention, which is disclosed more particularly in Figs. 5, 6, and 7, 49 indicates a casting comprising a socket 50 to receive the draw-bar or draw-head 51, said casting also comprising a horizontal plate 52, the length of which extends transversely of the body 1 and is such as to extend under the lower flanges of the I-beams which constitute the inner or central sills 19. These flanges are indicated by the reference-numeral 53, and the horizontal plate 52 is bolted or otherwise secured to said flanges, as indicated at 54. Along its inner edge the plate 52 is provided with a vertical strengthening-rib 55, while its outer edge is provided with a vertical rib or lip 56, which extends upward immediately in front of the end plate 57 of the body 1. This lip 56 extends across or in line with the rear extremities of the sills or I-beams 19, so as to bear upon the end plate 57 directly opposite the ends of said sills. The casting 43 also comprises two downwardly and outwardly inclined diagonal ribs or webs 58, extending from the ends of the plate 52 to the body of the socket 50, so as to firmly brace said socket and give it and the entire casting increased stiffness. The horizontal member 52, vertical member 56, and inclined member 58 not only form a firm and rigid support for the socket 50, but also provide means for effectively uniting the casting to the widely-separated sills 19 and give the casting a firm bearing against said sills and the end of the car-body, while providing a clear open space below the fire-box for the ash-pan.

Referring next to that feature of our invention which relates to the attachment of the front ends of the swinging-cables, we have described and claimed in our prior Letters Patent, No. 760,456, hereinbefore referred to, an arrangement of swinging-cables in which each cable is doubled, its ends being secured to the swinging-drum and its forward end, where it is doubled or bent upon itself, passing around an equalizing-pulley carried by the swinging-circle. Our present invention as to this feature contemplates a simpler and more satisfactory and direct connection of the front end of the doubled swinging-cables, the same being shown more particularly in Figs. 1 and 8 of the drawings. In this construction the boom, which is, as usual, composed of the two parallel members 46, hereinbefore referred to, spaced apart, so as to leave an opening between them, is provided near its heel or foot with a casting 59, secured to its under side, having a tie-plate 60, bottom plate 61, and side plates 62, forming between them an opening 63, through which the looped ends of the cables 64 pass. Each cable passes around an equalizing-pulley 65, carried by a yoke 66 on the forward end of an adjusting-rod 67, which is threaded at its rear end and passes loosely through a saddle-piece 68 on the back or upper side of the boom, its projecting end receiving a nut 69, which bears against the back of the saddle 68 and by means of which the rod and equalizing-pulley may be adjusted to take up the slack of the cable. It will thus be seen that the equalizing-pulleys and their adjusting-rods are connected to and located within the boom, from which they are out of the way and well protected, their connection with the boom rendering the construction simpler and more compact and relieving the swinging-circle of the strains of this connection.

Figures 9, 10, 11:
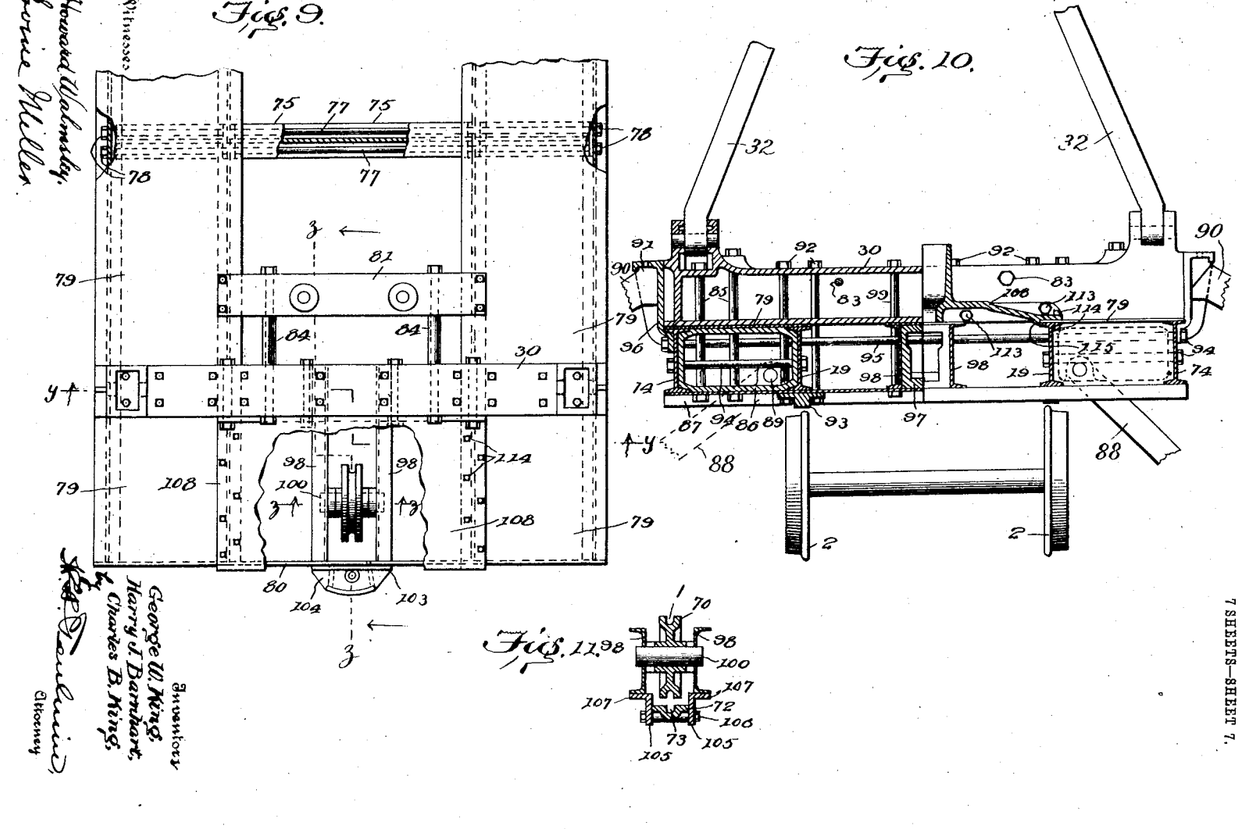
Fig. 9 is a plan view of the same, partly broken away to show the underlying construction.
Fig. 10 is a transverse vertical sectional view taken on the line $y\ y$ of Fig. 9 and looking in the direction of the arrows.
Fig. 11 is a detail sectional view taken on the line $z\ z$ of Fig. 9 and looking in the direction of the arrows.

Referring next to the fifth feature of our present invention, it will be understood that the hoisting-chain after it leaves the hoisting-drum 3 extends forward to a point below the hollow central journal of the swinging-circle, up through which it passes vertically in the usual manner. To guide the hoisting-chain at this point, the usual guide-sheave 70 is employed, having a peripheral groove 71 to receive the upper portions of those links of said chain which lie in a vertical plane while passing under said sheave. To prevent the chain from dropping away and being disengaged from the sheave 70 when there happens to be considerable slack in the hoisting-chain, we provide a guard or shield 72, located immediately below the sheave 70 and having a longitudinal groove 73, lying in the same vertical plane as the groove 71 of said sheave. The space between the face of said guard or shield and the face of the sheave 70, which is shown more particularly in Figs. 8 and 11, is sufficient to permit the ready passage of those links of the chain which lie in a horizontal position as they pass under the sheave 70, while the grooves 71 and 73 provide for the passage of the vertical links, the chain being thus so guided as to be maintained in proper relation to the sheave 70 no matter how slack the hoisting-chain may be.

Referring now more particularly to the structural features at the front end of the body 1, it will be noted that the I-beams or sills 19 extend the entire length of the body and form the inner sills thereof, while similar I-beams 74 also extend the length of the body and form the outer sills thereof. These longitudinal sills are braced apart at intervals by spacing blocks or castings 75 between each pair of sills, the same being in the form of I-beams with end plates to bear against the vertical webs of the sills. The sills and spacing or separating blocks are all firmly united by means of long rods or bolts 77, which pass entirely through the body from side to side thereof, extending through the vertical webs of the sills and through the end plates 76 of the spacing or separating blocks or castings, said rods or bolts being threaded at each end and provided with nuts 78, by means of which the structure may be brought and held firmly together by the tightening up of the nuts on the ends of said rods or bolts at either side of the car.

The spaces between the sills 19 and 74 at each side of the body are covered by top plates 79, and the end of the body is formed by a vertical front plate 80, similar to the end plate 57 at the other end of the body. Spanning the space between the inner sills 19 is the arch casting 81, which supports the guide-sheaves 82, and in front of the arch casting there is located above the deck, resting on the plates 79, the sill 30, already referred to, which supports the A-frame 32. These two castings—to wit, the arch 81 and sill 30—are connected and braced apart by means of bolts 83 passing horizontally through both castings, as shown more particularly in Figs. 8 and 9. Spacing-sleeves 84, of gas-pipe or the like, are placed upon the bolts 83 between the castings 81 and 30 and serve to maintain the said castings firmly in proper relative position. The sill-casting 30 is secured in place at each end by means of vertical bolts 85, which pass downward through said sill-casting and through the plates 79 and also through the spacing-blocks 86 and the inverted channel-bar 87, which forms the lower transverse sill or body-bolster. The bolts 85 are finished bolts, and they pass through and fit reamed apertures in the plates 79 and in the adjacent walls of the sill and spacing-castings, thereby preventing the sill-casting 30 from sliding over the top plates 79 and causing the parts to wear. This sliding tendency arises from the fact that the lower tie-bars 88 of the supporting-jacks at the sides of the body are connected to the spacing-castings 86 by means of the aperture-lugs 89, while the upper member 90 of each jack has its bearing upon the socket 91, so that there is a tendency for the sill-casting 30 and the plate 79, which latter is supported by the beams 19 and 74 and spacing block or casting 86, to move in opposite directions under the strains of the jack, and thereby produce a shearing action on the bolts 85 in case of any looseness of the parts. Vertical bolts 92 pass downward through the casting 30 on each side of each of the beams 19 and also through the bolster 87, one pair of said bolts 92 passing through the spacing-casting 86, and said bolts 92 also pass through and support within the channel-bar 87 the side bearings 93. The spacing-castings 86 are held firmly between the channel-bars 19 and 74 by horizontal bolts 94, and the horizontal bolts 95 pass entirely through the body 1 from side to side thereof, also passing through the lower ends of the castings 96, which bear the sockets 91, holding these latter firmly in place against the outer I-beams or sills 74.

97 indicates a center casting supported on the bolster 87 and held in position between longitudinal channel-bars 98, which are secured at their rear ends by bolts 99 passing downward through the sill-casting 30, the flanges of the channel-bars 98, and the bolster 87. These channel-bars 98 are supported at their front ends from the front plate 80 and support the bearing pin or journal 100, on which the sheave 70 is mounted. The supporting of the channel-bars 98 at their front portions is effected by means of a casting 101, provided with a socket 102 to receive the forward draw-head or draw-bar, said casting having a vertical flange 103, which is secured to the front of the end plate 80, and a horizontal body portion 104, which extends inward under the plate 80 and under the forward extremities of the channel-bars 98. Vertical inwardly-extending flanges 105 of the casting 101 support between them the guard or shield 73, which is secured to them by bolts 106, and these vertical extensions or flanges 105 have at their upper edges outwardly-extending flanges 107, which are united to the bottom flanges of the channel-bars 98.

The journal-casting for the swinging-circle consists of a base portion 108 and an upwardly-extending hollow journal portion 109, through which the hoisting-chain passes and upon which the journal sleeve or hub 110 of the swinging-circle 111 fits. The base 108 of the journal-casting is provided at its rear with a depending flange 112, which is secured to the sill-casting 30 by means of bolts 113. Said journal-casting base is further secured in place at its longitudinal edges not only by being bolted to the plates 79 immediately above the beams 19 by means of bolts 114 passing down through the plates 79 and the top flanges of the beams 19, but also by lugs or flanges 115, which bear against the inner edges of the plates 79 and against the top flanges of the beams 19, as shown in Fig. 10. Since the bolts 95 pass entirely through the body from side to side thereof, they draw the beams 74 and 19 and intermediate spacing-block 86 on each side of the center body toward and firmly against the journal-base 108, so that all of the parts are firmly united and braced apart. The various structural elements forming a part of or mounted upon the front of the body 1 are thus firmly supported and united and held in proper relative position, thus enabling them to withstand the severe strains to which they are subjected in the ordinary use of the apparatus.

We do not wish to be understood as limiting ourselves to the precise details of construction hereinbefore specified, and shown in the accompanying drawings; nor is it essential that all of the features herein described be conjointly embodied in one structure, since it is obvious that various modifications may be made in the details, and some of the advantageous features hereinbefore pointed out may be dispensed with.

Having thus fully described our invention, what we claim as new, and desire to secure by Letter Patent, is—

1. In a steam-shovel, the combination, with a body or support, of a hoisting-drum and separated engines therefor located on said body, and swinging-engines and a swinging-drum located and supported on said body between and independent of the hoisting-engines, substantially as described.

2. In a steam-shovel, the combination, with a body or support, of a hoisting-drum and separated engines therefor located on said body, swinging-engines located on said body between the hoisting-engines, a separate frame also located on said body between the hoisting-engines, and a swinging-drum and its gearing mounted on said separate frame, substantially as described.

3. In a steam-shovel, the combination, with a body having a hollow anchor-casting, of an A-frame pivotally mounted on said body, a guy or back leg detachably connected to said A-frame and anchor-casting and adapted to slide through said anchor-casting when disconnected, links or tie-rods connected to said anchor-casting and adapted for connection to the guy or back leg to limit its rearward movement when disconnected, and a removable strut or brace adapted to bear on the body and A-frame head to support the same in lowered position, substantially as described.

4. In a steam-shovel, the combination, with a body having widely-separated longitudinal sills, of a draw-head socket-casting comprising a socket proper, a horizontal plate member secured to the under side of the sills, a vertical member secured to the end of the body and extending to the ends of the sills, and a diagonal inclined truss-web between the socket proper and horizontal plate member, substantially as described.

5. In a steam-shovel, the combination, with a body or support, of a swinging-circle, a swinging-drum and guide-sheaves mounted on said body, double cables connecting said drum and circle, a boom carried by said circle, and equalizing-pulleys carried by said boom, each double cable passing around one of said equalizing-pulleys, substantially as described.

6. In a steam-shovel, the combination, with a body, of a swinging-circle, a swinging-drum and swinging-engines mounted on said body, a boom mounted on said swinging-circle and comprising separated parallel members, a casting supported between said members and having an opening therethrough, equalizing-sheaves adjustably mounted within the space between the members of the boom, and double cables extending from the swinging-drum around the opposite sides of the swinging-circle, through the opening in the casting and around the equalizing-sheaves, substantially as described.

7. In a steam-shovel, the combination, with a body having a hoisting-drum and a swinging-circle provided with a boom, said circle having a hollow trunnion, and a hoisting-chain passing vertically through said hollow trunnion, of a guiding-sheave located below said trunnion, and a guard or shield located below said guiding-sheave to prevent the hoisting-chain from disengaging from said sheave when slack, substantially as described.

8. In a steam-shovel, the combination, with a body having a hoisting-drum, and a swinging-circle provided with a boom, said swinging-circle having a hollow trunnion, and a hoisting-chain passing upward through said hollow trunnion, of a guiding-sheave located below said hollow trunnion and having a peripheral groove, and a guard or shield located below said guiding-sheave and provided with a groove coöperating with that of the sheave to form a passage for the vertical links of the chain, the space between the faces of said sheave and shield forming a guide for the horizontal links, whereby the chain is prevented from disengaging from the sheave when slack, substantially as described.

9. In a steam-shovel, the combination, with a body having mounted and secured thereon a transverse sill-casting to support the A-frame, and an arch casting to support the guide-sheaves, of bolts connecting said castings above the body, and spacing-sleeves mounted on said bolts between the castings, substantially as described.

10. In a steam-shovel, the combination, with a body, and an A-frame sill-casting secured thereon, of a swinging-circle journal-casting secured to said body in front of said sill, and bolts connecting said journal and sill castings, said journal-casting bearing at its rear portion against said sill-casting, substantially as described.

11. In a steam-shovel, the combination, with a body comprising longitudinal sills and deck-plates mounted thereon, of spacing-castings secured between the sills, a transverse A-frame sill-casting resting on the deck-plates above the spacing-castings, and vertical bolts passing through said sill-casting and spacing-castings and through the deck-plates, said bolts being finished bolts fitted in reamed apertures in the deck-plates and in the adjacent walls of the sill and spacing castings, substantially as described.

12. In a steam-shovel, the combination, with a body comprising longitudinal sills formed of I-beams, of spacing blocks or castings fitting between said sills and between the I-beam flanges, and bolts passing transversely through the body from side to side thereof and extending through the I-beam sills and spacing-castings, substantially as described.

13. In a steam-shovel, the combination, with a body comprising longitudinal sills formed of I-beams, of spacing blocks or castings fitting between said sills and between the I-beam flanges, bolts passing transversely through the body from side to side thereof and extending through the I-beam sills and spacing-castings, and shorter bolts passing through each pair of longitudinal sills and the intervening spacing blocks or casting, substantially as described.

14. In a steam-shovel, the combination, with a body comprising longitudinal sills arranged in pairs at each side of the body, of a spacing-casting between each pair of sills, adapted for connection thereto of the lower tie-bars of the jack, deck-plates supported on each pair of sills, an A-frame sill-casting supported to said deck-plates above the spacing-castings, socket-castings bearing upon the ends of said A-frame sill and extending down to the outer longitudinal sills, vertical securing-bolts passing through the A-frame sill, deck-plates and spacing-castings, and horizontal bolts passing through the socket-castings, longitudinal sills and spacing-castings, substantially as described.

15. In a steam-shovel, the combination, with a body comprising longitudinal sills arranged in pairs at each side thereof, intermediate spacing-castings, and deck-plates secured on said sills, of a transverse A-frame sill secured to said body, a journal-casting secured to the inner sills and deck-plates and having flanges abutting against the edges thereof, and through-bolts passing through the body from side to side, substantially as described.

16. In a steam-shovel, the combination, with a body comprising longitudinal sills arranged in pairs at each side thereof, intermediate spacing-castings, and deck-plates secured on said sills, of a transverse A-frame sill secured to said body, a journal-casting secured to the inner sills and deck-plates and having flanges abutting against the edges thereof, and through-bolts passing through the body from side to side, said journal-casting abutting against and being bolted to the A-frame sill, substantially as described.

17. In a steam-shovel, a body comprising longitudinal I-beam sills, spacing blocks or castings located between each pair of sills and provided with transverse plates or members fitting between the I-beam flanges, and rod-bolts passing through said longitudinal sills and through the spacing blocks or members from side to side of the car, and provided with adjusting-nuts at their exposed ends, substantially as described.

18. In a steam-shovel, the combination, with a body comprising a front end plate and center casting, of channel-bars secured to said plate and casting, and a hoisting-chain guide-sheave mounted and supported in said channel-bars, substantially as described.

19. In a steam-shovel, the combination with a body comprising a front end plate and center casting, of channel-bars secured to said plate and casting, a hoisting-chain guide-sheave mounted and supported in said channel-bars, and a casting secured to the front plate, provided with a draw-head socket, and having horizontal and vertical flanges, the former secured to the channel-bars, and a guide or shield secured between the vertical flanges of said casting below the sheave, substantially as described.

20. In a steam-shovel, the combination, with a body comprising longitudinal sills, a transverse A-frame sill, and side bearings located below the inner longitudinal sills, of vertical bolts passing through the A-frame sill, body and side bearings, substantially as described.

21. In a steam-shovel, the combination, with a body having an anchor-casting, of an A-frame mounted on said body, a guy or back leg detachably connected to said A-frame, and movable downward and rearward from its normal position, and means for connecting said back leg to the anchor-casting when thus lowered, substantially as described.

22. In a steam-shovel, the combination, with a body, of an A-frame pivotally mounted on said body, a guy or back leg detachably connected to said A-frame, and a removable strut or brace adapted to bear on the body and A-frame head to support the A-frame in lowered position, substantially as described.

23. In a steam-shovel, the combination, with a body comprising a plurality of longitudinal sills and a transverse A-frame sill, of a journal-casting secured to and having flanges abutting against the longitudinal sills, said journal-casting abutting against and being bolted to the A-frame sill, substantially as described.

24. In a steam-shovel, the combination, with a body having mounted and secured thereon a transverse sill-casting to support the A-frame, and an arch casting to support the guide-sheaves, of means connecting said castings above the body to cause them to mutually support and brace each other, substantially as described.

25. In a steam-shovel, the combination, with a body, of a transverse sill-casting to support the A-frame secured thereon, an arch casting supporting the guide-sheaves and secured on said body in the rear of the A-frame sill-casting, and a swinging-circle journal-casting secured to said body in front of said A-frame sill-casting, said three castings being connected to each other independently of the body so as to mutually support and brace each other, substantially as described.

26. In a steam-shovel, the combination, with a body, of an A-frame mounted on said body, a guy or back leg detachably connected to said A-frame and movable downward and rearward from its normal position, and means for anchoring said back leg in said lowered position, substantially as described.

In testimony whereof we affix our signatures in presence of two witnesses.

GEORGE W. KING.
HARRY J. BARNHART.
CHARLES B. KING.

Witnesses:
HARVEY T. GRACELY,
ROBERT G. LUCAS.